United States Patent
Krebs et al.

(10) Patent No.: US 6,199,899 B1
(45) Date of Patent: Mar. 13, 2001

(54) AIRBAG MODULE

(75) Inventors: Jürgen Krebs, Aschaffenburg; Michael Bathon, Stockstadt; Jürgen Burgard, Hösbach; Udo Bieber, Niedernberg; Kurt Kullman, Sulzbach, all of (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 09/491,415

(22) Filed: Jan. 26, 2000

(30) Foreign Application Priority Data

Jan. 26, 1999 (DE) .............................. 299 01 286

(51) Int. Cl.⁷ .................................................. B60R 21/16
(52) U.S. Cl. ........................................ 280/731; 280/728.2
(58) Field of Search .......................... 280/728.2, 728.1, 280/728.3, 731, 743.1

(56) References Cited

U.S. PATENT DOCUMENTS

| | | | |
|---|---|---|---|
| 5,482,313 | * 1/1996 | Ikeya et al. | 280/728.2 |
| 5,794,967 | * 8/1998 | Manire | 280/728.3 |
| 5,794,968 | * 8/1998 | Yamomoto et al. | 280/728.2 |
| 5,816,608 | * 10/1998 | Tanabe | 280/728.2 |
| 5,829,777 | * 11/1998 | Sakurai et al. | 280/728.2 |
| 5,851,023 | * 12/1998 | Nagata et al. | 280/728.3 |
| 5,857,696 | * 1/1999 | Inoue et al. | 280/728.2 |

* cited by examiner

Primary Examiner—Brian L. Johnson
Assistant Examiner—Bryan Fischmann
(74) Attorney, Agent, or Firm—Tarolli, Sundheim, Covell, Tummino & Szabo L.L.P.

(57) ABSTRACT

An airbag module for arrangement in motor vehicle steering wheels has a cup-shaped generator carrier (1) and a covering cap (2). The generator carrier (1) consists of a shaped sheet metal section with a side wall (4) aligned parallel to the steering wheel axis (3). A plurality of outwardly angled tabs (5) are provided on the upper rim of the side wall (4). A rectangular opening (6) is arranged in the side wall (4) beneath each tab. Further, a bending tongue (7) connected with the side wall (4) is provided each beneath opening (6). The covering cap (2) consists of plastic and has a surrounding side wall (8) with slits (9) that is fitted externally against the side wall (4) of the generator carrier (1). The side wall (8) has radial openings (10) for engagement of the tabs (5) and radially inwardly directed integral projections (11) each of which when fitted against the side wall (4) of the generator carrier (1) rests on a lower rim of a opening (6) of the side wall (4). The bending tongue (7) in the mounted state is bent upwards, lying externally against the side wall (8) of the covering cap (2).

5 Claims, 4 Drawing Sheets

AIRBAG MODULE

The present invention relates to an airbag module for arrangement in motor vehicle steering wheels, comprising a cup-shaped generator carrier and a covering cap, the generator carrier and the cap being connected with each other.

BACKGROUND

In such airbag modules, various limiting conditions must be taken into account for the development of the connection between the generator carrier and the covering cap. Firstly, it must be ensured that the connection withstands all forces occurring during the sudden unfolding of the gas bag, because a release of parts of the cap or of the cap as a whole, which tears open and folds out along given lines on activation of the gas bag, caused by an accident, must be avoided under all circumstances with regard to the risk of injury related therewith. The development of the connection is made difficult in that these forces are effective not only in the direction of unfolding of the air bag, but momentarily also in the opposite direction.

In addition, it is to be noted that the cap of an airbag module generally is designed as an actuating member for the vehicle horn and for this is arranged so as to be movable against a return force approximately parallel to the steering wheel axis across at least the contact distance relative to the steering wheel. With the connection between the cap and generator carrier, care must be taken that these parts are secured to each other so as to be immovable relative to each other, so that the horn function or the contact distance to be set in close limits can be maintained.

Finally, the connection between the covering cap and the generator carrier should be as simple as possible and preferably be made without any tools.

Conventional connections between the cap and the generator carrier do not always fulfill the above-mentioned requirements optimally, so that engineers are constantly endeavoring to further improve these connections. In addition to this is the fact that motor vehicle steering wheels are likewise constantly further developed, which can lead to conventional fastening methods no longer being able to be applied and therefore likewise having to be modified.

SUMMARY

The present invention provides an improved airbag module for a simple and cheap connection between the cover cap and the generator carrier.

According to the invention, the generator carrier consists of a shaped sheet metal section with a side wall aligned substantially parallel to the steering wheel axis, which side wall has at least two fastening regions distributed peripherally, each such fastening region having

- at least one outwardly angled tab on the upper rim of the side wall,
- a rectangular opening arranged in the side wall therebeneath and
- a bending tongue, produced by punching from the side wall beneath the window cut-out;
- the covering cap consisting of plastic and having a surrounding side wall with vertical slits and lying externally against the side wall of the generator carrier, which side wall for each fastening region having
- a radial through opening for engagement of a tab and
- a radially inwardly directed, integrally molded projection, which in the mounted state rests on a lower rim of the opening of the side wall, the bending tongue in the mounted state being bent upwards and lying externally against the side wall of the covering cap.

In the proposed airbag module, it is assumed that a sufficient reciprocal positioning and fixing of the generator carrier and the covering cap can be achieved in a plane perpendicular to the steering wheel axis. The generator carrier and the covering cap wall are provided with regions which correspond to each other and abut concentrically against each other. The corresponding regions cooperate to produce an interconnection between the generator carrier and the covering cap which is reliable in operation and merely requires an exact positioning of both the generator carrier and the covering cap relative to each other in the direction of the steering wheel axis.

Here, the wall of the covering cap parallel to the steering wheel axis is divided by longitudinal sections into regions which are able to be spread outwards elastically to such an extent that they can be displaced readily over the outwardly angled tabs of the generator carrier. After the engaging of these tabs into the recesses of the covering cap, the connection thus created is secured by bending the bending tongues upwards. At the same time, the radially inwardly-directed projections, which are integrally molded on the side wall of the covering cap and in the mounted state rest on the lower rim of the opening in the side wall of the generator carrier, provide for the connection to be free of play in the direction of the steering wheel axis, so that neither the predetermined contact distance nor the horn function are impaired.

BRIEF DESCRIPTION

Further details of the invention are explained more closely with the aid of the example embodiment illustrated in FIGS. 1 to 4, in which.

DETAILED DESCRIPTION

Figure 1:
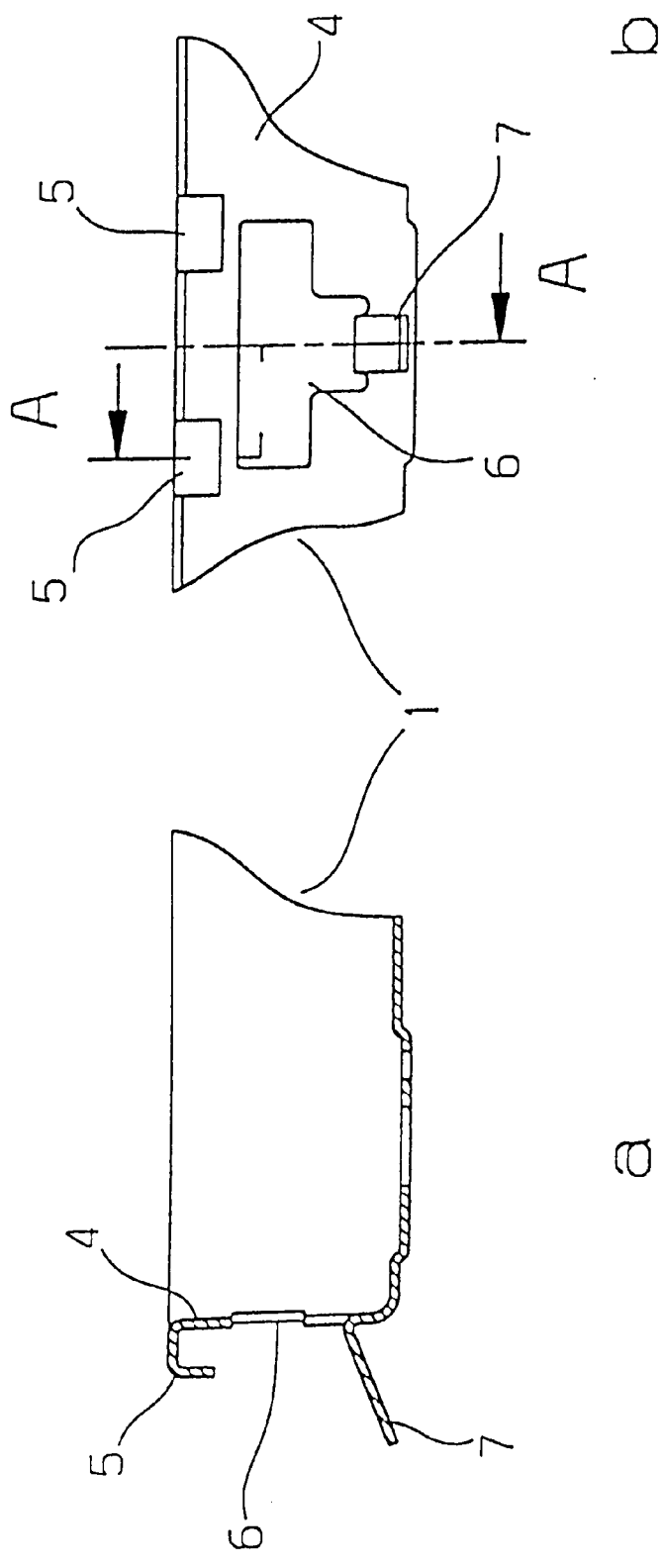
FIG. 1 shows a part of a generator carrier in elevation and in section
Figure 4:
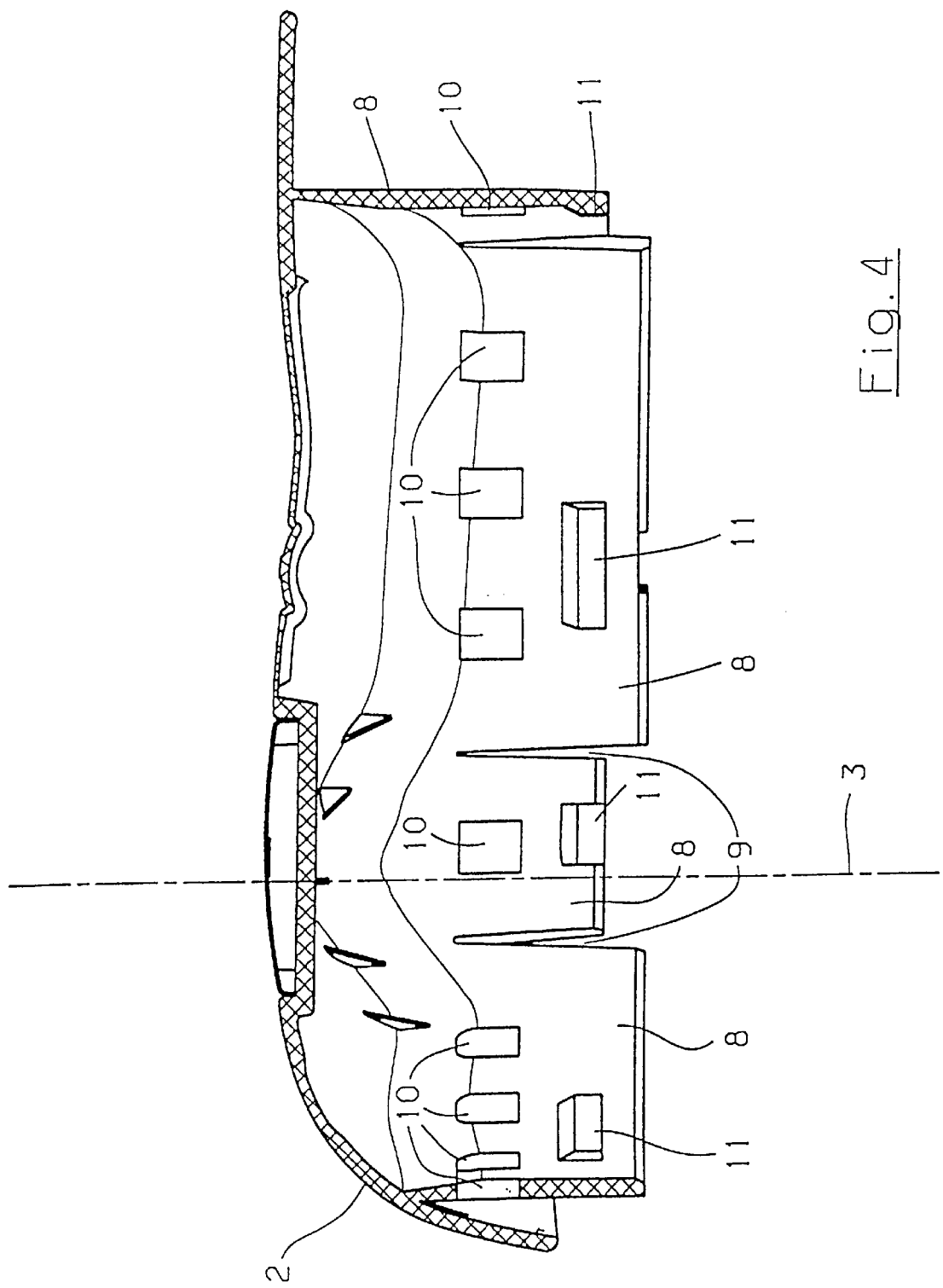
FIG. 4 shows a section through the covering cap.

The generator carrier 1 according to FIGS. 1a and 1b consists of a sheet metal section formed in a cup shape, the side wall 4 of which is aligned substantially parallel to the steering wheel axis 3 (see FIG. 4). Several, but at least two, fastening regions are provided on the periphery of the side wall 4, which respectively comprise an outwardly angled tab 5 on the upper rim of the side wall 4, a rectangular opening 6 in the side wall 4 arranged therebeneath, and also a bending tongue 7 produced by punching from the side wall 4 beneath the window cut-out 6 with the side wall 4. In the construction of the fastening regions, conventional punching- and bending devices are used which are known from sheet metal working.

Figure 2:
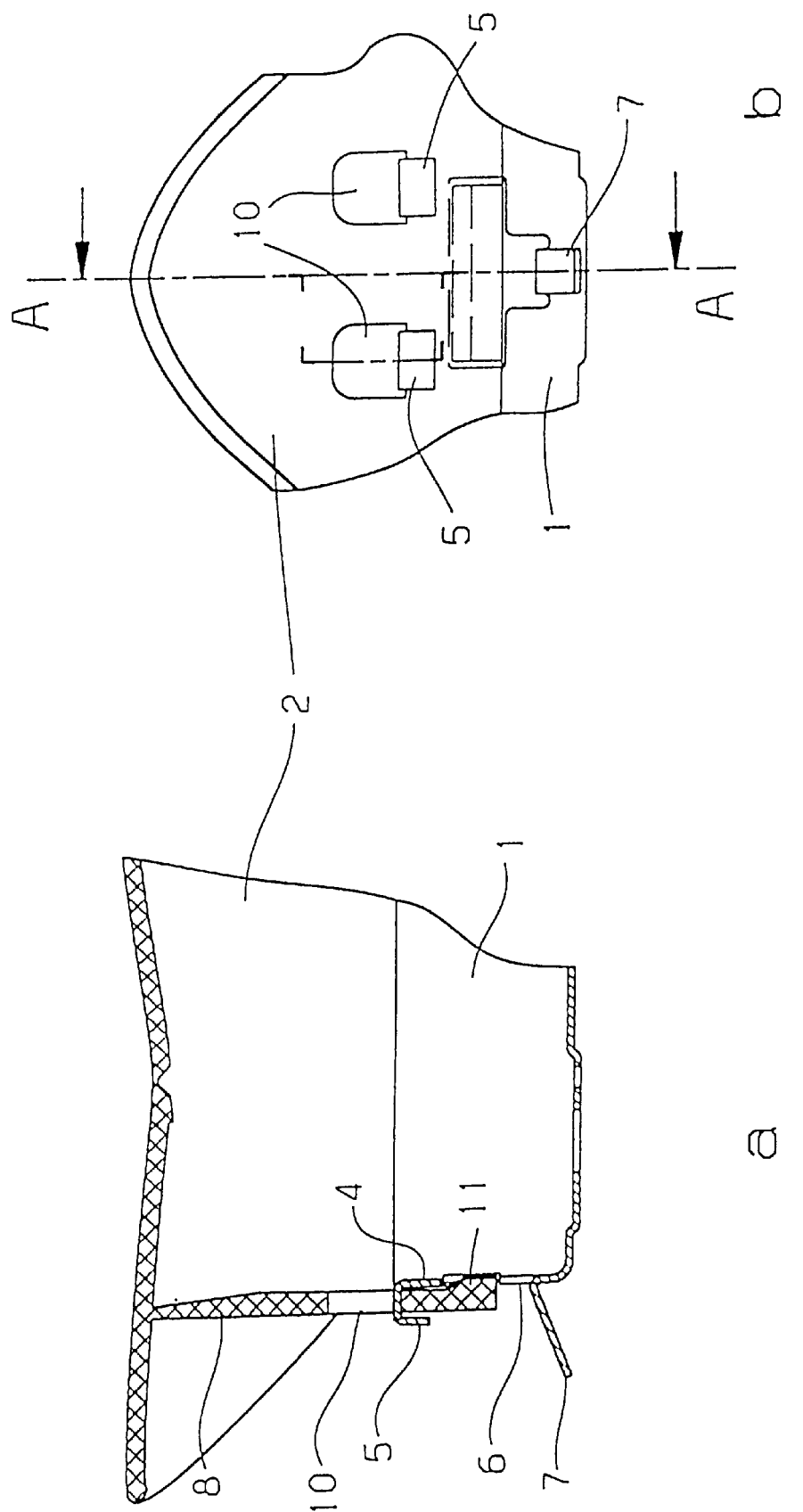
FIG. 2 shows a part of the generator carrier and of the covering cap in elevation and in section
Figure 3:
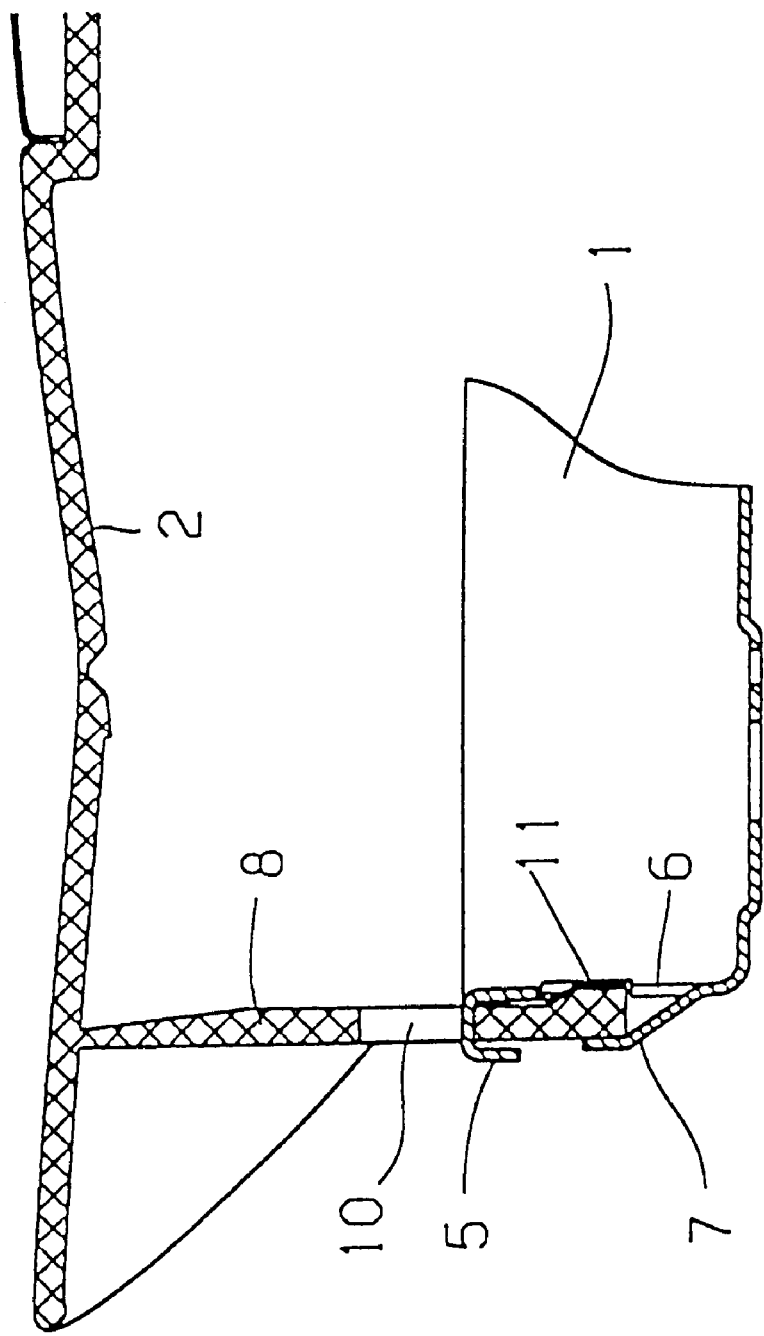
FIG. 3 shows the section according to FIG. 2 after the completed bending up of the bending tongue

The covering cap 2 illustrated in FIGS. 2a and 2b consists of plastic and has a surrounding side wall 8 lying externally against the side wall 4 of the generator carrier 1 and having vertical slits 9 (FIG. 4). Corresponding to the angled extensions 5 on the generator carrier 1, radial through openings 10 are provided in the side wall 8 of the covering cap 2, into which openings 10 the tabs 5 can engage on assembly. In addition, the side wall 8 of the covering cap 2 for each fastening region has a radially inwardly directed, integrally molded projection 11 which in the mounted state rests on the lower rim of the opening 6 of the side wall 4. In this way, the necessary reciprocal fixing of covering cap 2 and generator carrier 1 is ensured. By folding the bending tongues 7 upwards—as can be seen from FIG. 3—this connection is additionally secured and made free of play.

FIG. 4 shows a section through a covering cap according to the invention, in which the covering cap is designated by 2 and the steering wheel axis is designated by 3. The radial through openings 10 and the radially inwardly directed integral projections 11 are distributed in circumferential direction of the side wall 8 so that everywhere a reliable connection can be achieved between covering cap 2 and generator carrier 1. The side wall 8 is divided by vertical slits 9, i.e. directed approximately parallel to the steering wheel axis, into individual regions, in order to facilitate the necessary spreading on assembly. In addition, regions of the side wall 8 of different lengths are illustrated. The shorter regions extend only up to the lower edge of the projections 11, whereas the other regions are constructed so as to be distinctly longer. In this respect, however, this is only an adaptation to local conditions and not a step which is essential to the invention. However, the result of this is that in the side wall 8 of the covering cap 2, entirely different recesses can also be provided, when the conditions of installation requires this and the remaining regions of the side wall 8 ensure a sufficient fixing in a plane perpendicular to the steering wheel axis. Equally, the side wall 4 of the generator carrier can also have recesses. It must only be ensured that in each case both on the generator carrier 1 and on the covering cap 2, so many side wall regions are present that the desired securing perpendicular to the steering wheel axis is ensured under all circumstances.

What is claimed is:

1. An airbag module for arrangement in motor vehicle steering wheels comprising:

a cup-shaped generator carrier having a shaped sheet metal section with a side wall aligned substantially parallel to the steering wheel axis; and a covering cap being fitted on an outer edge of the generator carrier, the covering cap being plastic and having a surrounding side wall with vertical slits, the side wall of the covering cap lying external to and against the side wall of the generator carrier when the covering cap is fitted on the generator carrier;

the side wall of the generator carrier having at least two fastening regions, each fastening region having at least one outwardly angled tab on an upper rim of the side wall, a rectangular opening in the side wall beneath the tab, and a bending tongue punched from the side wall beneath the opening;

for each fastening region of the generator carrier the side wall of the covering cap having a radial through opening for engaging an outwardly angled tab of the generator carrier and a radially inwardly directed, integrally molded projection;

when the covering cap is fitted on the generator carrier each molded projection of the covering cap rests on a lower rim of the generator carrier side wall opening and the bending tongue of the generator carrier is bent upwardly and lies external to and against the side wall of the covering cap.

2. The airbag module as in claim 1, wherein the side wall of the covering cap is divided by the vertical slits into at least two regions, each region having at least one fastening point.

3. The airbag module as in claim 2, wherein the side wall of the covering cap has narrow regions with only one fastening point and wide regions with at least one fastening point.

4. The airbag module as in claim 1, wherein the radial through openings in the side wall of the covering cap are rectangular and are adapted in width and height to the tabs on the side wall of the generator carrier.

5. The airbag module as in claim 4, wherein the tabs on the generator carrier are hook shaped and have downward angled ends, the ends having a length that is less than a corresponding length of the radial through openings in the side wall of the covering cap.

* * * * *